R. N. MOORE.
HOE.
APPLICATION FILED FEB. 26, 1920.

1,360,775.

Patented Nov. 30, 1920.

WITNESSES

INVENTOR
Rinaldo N. Moore.
BY
ATTORNEYS

UNITED STATES PATENT OFFICE.

RINALDO N. MOORE, OF MITCHELL, IOWA.

HOE.

1,360,775.    Specification of Letters Patent.    Patented Nov. 30, 1920.

Application filed February 26, 1920. Serial No. 361,420.

*To all whom it may concern:*

Be it known that I, RINALDO N. MOORE, a citizen of the United States, and a resident of Mitchell, in the county of Mitchell and State of Iowa, have invented a new and Improved Hoe, of which the following is a description.

My invention relates to wheeled hoes and more particularly relates to an attachment adapted to be applied to the standard makes of wheeled hoes.

The present invention is an improvement on the hoe forming the subject matter of United States Letters Patent, No. 1,256,352, granted to me February 12, 1918, the general object of the present invention being to provide an improved shield in lieu of the shield disclosed in the said patent. In the patented arrangement a shield is provided rigid with a front U-shaped knife and a rear U-shaped knife, and neither of the knives can be adjusted transversely independently of the shield and relatively to the other knife. The present invention is distinguished by various characteristics among which are: (*a*) It provides an arrangement whereby one knife may be adjusted transversely and is rockable relatively to the other knife and independently of the guard; (*b*) the guard is so formed with cutting edges and so positioned that it constitutes a colter to cut hard ground in advance of the front U-shaped knife; and (*c*) the guard although rigid with the front knife nevertheless has a relation to the rear knife in preventing plants from getting in front of and being damaged by the rear knife, whereby it has a guard relation to the rear knife although permitting the relative adjustment of the rear knife.

Reference is to be had to the accompanying drawings forming a part of this specification, it being understood that the drawings are merely illustrative of one example of the invention.

Figures 1, 2:
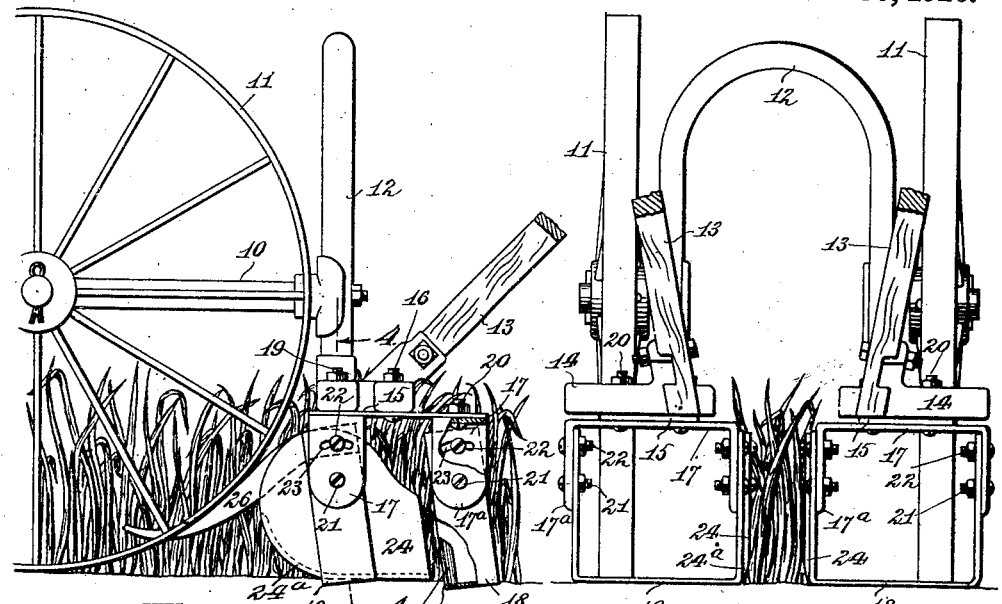
Figure 1 is a side elevation of the rear part of a wheeled hoe frame having my attachment applied thereto, parts being broken away.
Fig. 2 is a rear elevation with parts of the usual handles broken away.
Figures 3, 4:
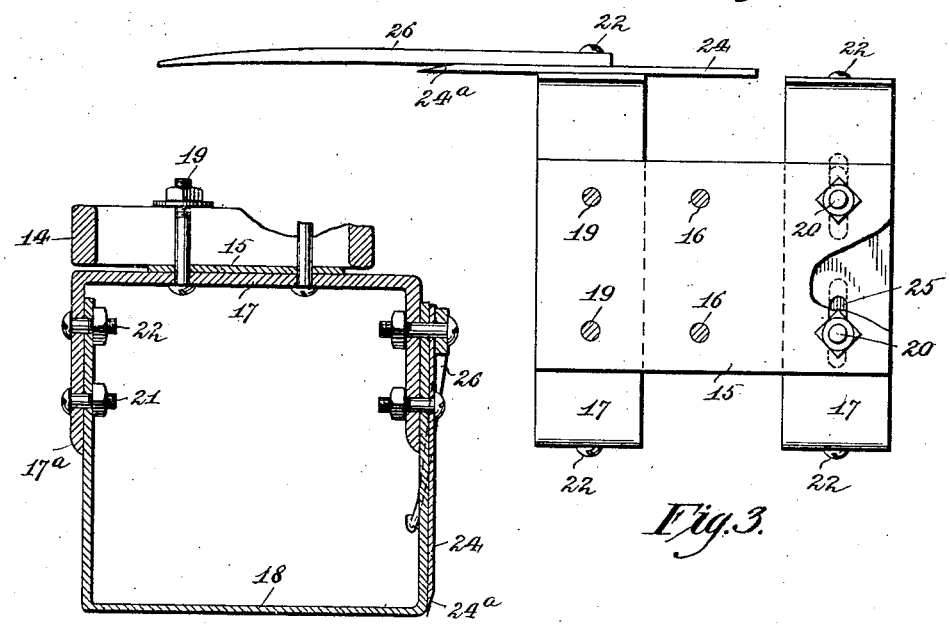
Fig. 3 is a sectional plan view showing one of my hoe attachments, parts being broken away.
Fig. 4 is a transverse vertical section on the line 4—4, Fig. 1.

In the drawings the numeral 10 indicates a known form of hoe frame having wheels 11, a rod 12, and handles 13, the numeral 14 indicating the rear portions of the frame 10. Plates 15 are secured to the frame portions 14 at the under side by bolts 16 and front and rear brackets 17 are carried at the under side of said plate to present downwardly disposed sides 17<sup>a</sup>. Front bolts 19 and rear bolts 20 secure each plate 15 in position, two of which plates are shown, and also secure the brackets 17. Front and rear U-shaped knives 18 are secured to the sides 17<sup>a</sup> by bolts 21 on which the knives may rock to assume different angular positions, the knives being further secured by additional bolts 22 extending through said sides and through arcuate slots 23 in said knives so that the knives may be secured in the adjusted position. The rear bracket 17 is adjustable transversely on the plate 15 by means of the bolts 20 which pass through slots 25 in the brackets. The numeral 26 indicates leaf lifters.

All the elements enumerated are disclosed in the patent above-mentioned and do not of themselves constitute any part of the present invention which resides in a novel shield 24 constituting a colter for the front knife 18 and a guard to prevent injury to the plants by the rear knife 18 or by said front knife secured at the opposed sides of the respective front knives 18. Each shield 24 is in the form of a broad plate secured by the front bolts 21, 22 and presenting an area to extend forward of the front knives 18 and extend rearwardly beyond said knives and adjacent to the rear knives 18. Thus, a single shield associated with each front knife constitutes a guard for the trailing rear knife. At the same time it will be observed that the form and arrangement of the shields 24 are such that the rear knives are permitted independent adjustment transversely through the medium of bolts 20 and slots 25, and also about their securing bolts 21 without interference by said shield. The shields 24 in addition to their function of preventing injury to the row of plants by the knives and adjacent parts, constitute also vertically disposed colters for the front knives, the lower edges of the shields being sharpened as at 24<sup>a</sup>, the sharpened edge extending from the heel of the shield forwardly beyond the front knife 18 with which the shield is associated. The front edge of the shield is rounded and the cutting edge 24ª extends upwardly following for a limited distance the curvature of the shield at the front. Thus, the shields in their character as colters serve to cut through hard ground in advance of the front knives 18. Thereby a single unitary implement associated directly with the front knife guards said front knife, guards also the independently adjustable rear knife, and constitutes a colter for the front knife to cut the ground in advance.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A hoe attachment including front and rear knives, means carrying said knives and adapted to be secured to a wheeled frame, the rear knife being adjustable transversely on the said means independently of the front knife and presenting transverse cutting members at the bottom and members extending upwardly from the cutting members, and a longitudinally extending shield disposed at the inner side of each front knife and extending rearwardly beyond said knife in shielding relation to the rear knife, said rear knife being independent of said shield.

2. A hoe attachment including front and rear knives presenting transverse cutting members at the bottom and upstanding members, the rear knives being adjustable independently of the front knives; means on which said upstanding members are carried, said means being adapted to be secured to a hoe frame, and shields extending longitudinally along the inner sides of the front knives and terminating sufficiently near to the rear knives to be independent of the adjustment of the latter but in shielding relation thereto to guard against plants being injured by said rear knives.

3. A hoe attachment including a front and rear knife, means on which said knives are carried, said means being adapted to be secured to a hoe frame, and shields extending longitudinally along the inner sides of said front knife and terminating sufficiently near to the rear knife to have shielding relation thereto, said rear knife being adjustable independently of said shield and front knife.

4. A hoe attachment including a front knife, a rear knife, means to secure the same in position on a hoe, the rear knife adjustable on said means independently of the front knife, and a combined guard and colter disposed alongside of said front knife and presenting a cutting edge extending forward of said front knife, the rear end of said combined guard and colter terminating close to but short of the rear knife to guard against plants being injured by the rear knife while affording clearance space for the independent adjustment of said rear knife.

5. An attachment for wheeled hoes, including supporting means adapted to be secured to the hoe, a knife carried by said supporting means and adjustable thereon, and a guard mounted on said supporting means in front of said knife and terminating at its rear end sufficiently close to the front of said knife to guard plants from injury by the knife but affording clearance for the adjustment of said knife on the supporting means independently of said guard.

RINALDO N. MOORE.